(12) United States Patent  
Weder

(10) Patent No.: US 6,374,578 B1  
(45) Date of Patent: Apr. 23, 2002

(54) FLORAL WRAPPER HAVING PRINTED DESIGN WITH SHADED AND HIGHLIGHTED AREAS

(75) Inventor: Donald E. Weder, Highland, IL (US)

(73) Assignee: Southpac Trust International, Inc., Raratonga Cook Island (*) Notice: Subject to any disclaimer, the term of this patent is extended or adjusted under 35 U.S.C. 154(b) by 0 days.

(21) Appl. No.: 09/469,674

(22) Filed: Dec. 22, 1999

Related U.S. Application Data

(63) Continuation of application No. 09/021,216, filed on Feb. 10, 1998, now abandoned.

(51) Int. Cl.[7] .............................. A01G 9/02; B65B 25/02
(52) U.S. Cl. .............................. 53/399; 53/411; 53/412; 53/416; 53/461
(58) Field of Search .................... 53/397, 399, 411, 53/412, 416, 419, 461, 464, 131.2–131.5, 218, 219, 381.2, 389.3, 390; 47/72; 206/423

(56) References Cited

U.S. PATENT DOCUMENTS

| | | | |
|---|---|---|---|
| 4,972,329 A | * 11/1990 | Breger | .................. 283/81 |
| 5,388,695 A | 2/1995 | Gilbert | |
| D368,024 S | 3/1996 | Sekerak et al. | |
| 5,496,252 A | 3/1996 | Gilbert | |
| 5,647,168 A | 7/1997 | Gilbert | |

* cited by examiner

*Primary Examiner*—Stephen F. Gerrity  
(74) *Attorney, Agent, or Firm*—Dunlap, Codding & Rogers, P.C.

(57) ABSTRACT

A method of forming a decorative cover, a sleeve or a preformed pot cover for a floral grouping or flower pot from a sheet of material having a printed pattern thereon wherein the printed pattern contains shaded and highlighted areas which provide the printed pattern with a visual perception of depth and thus a three-dimensional appearance.

52 Claims, 6 Drawing Sheets

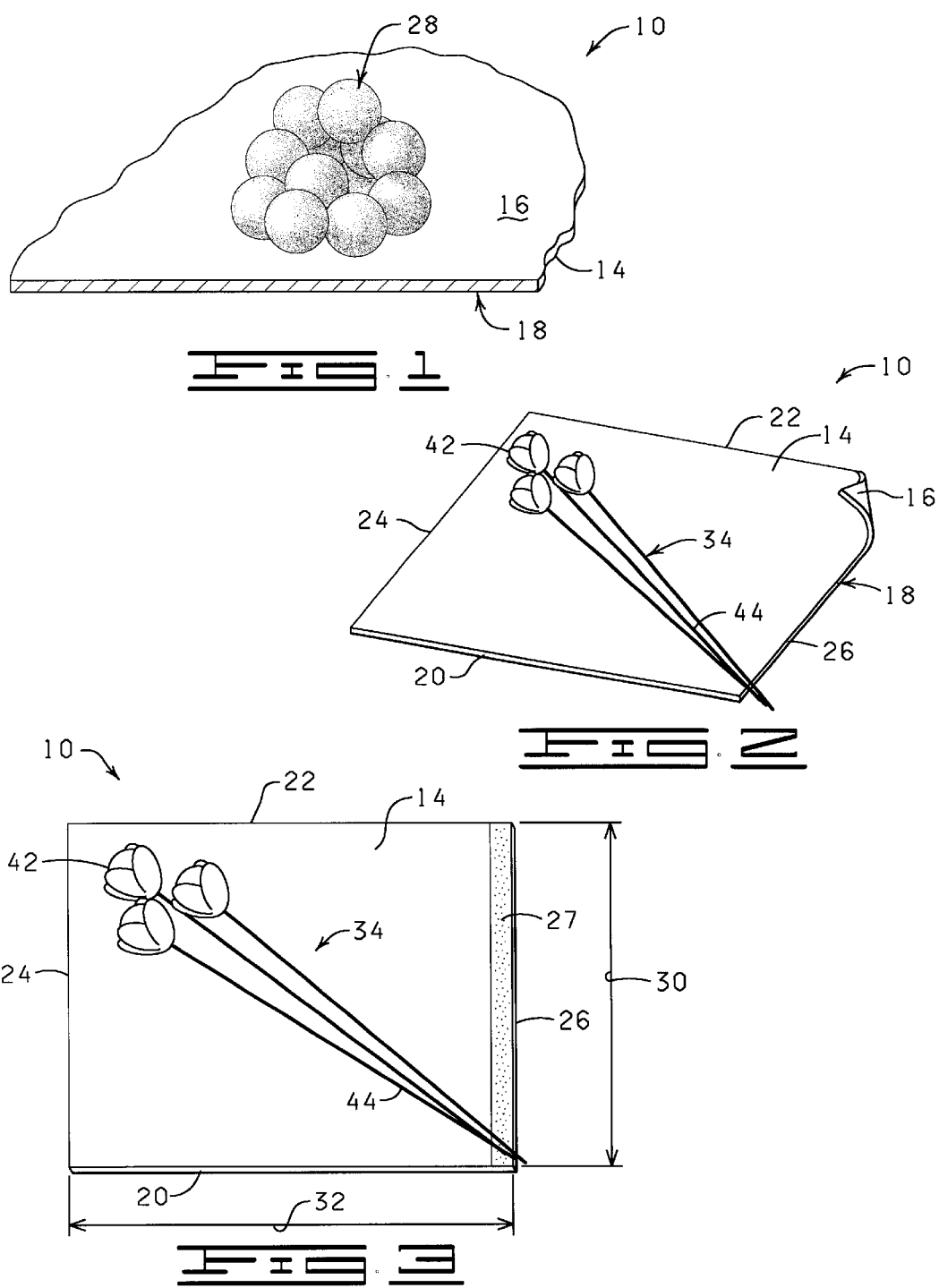

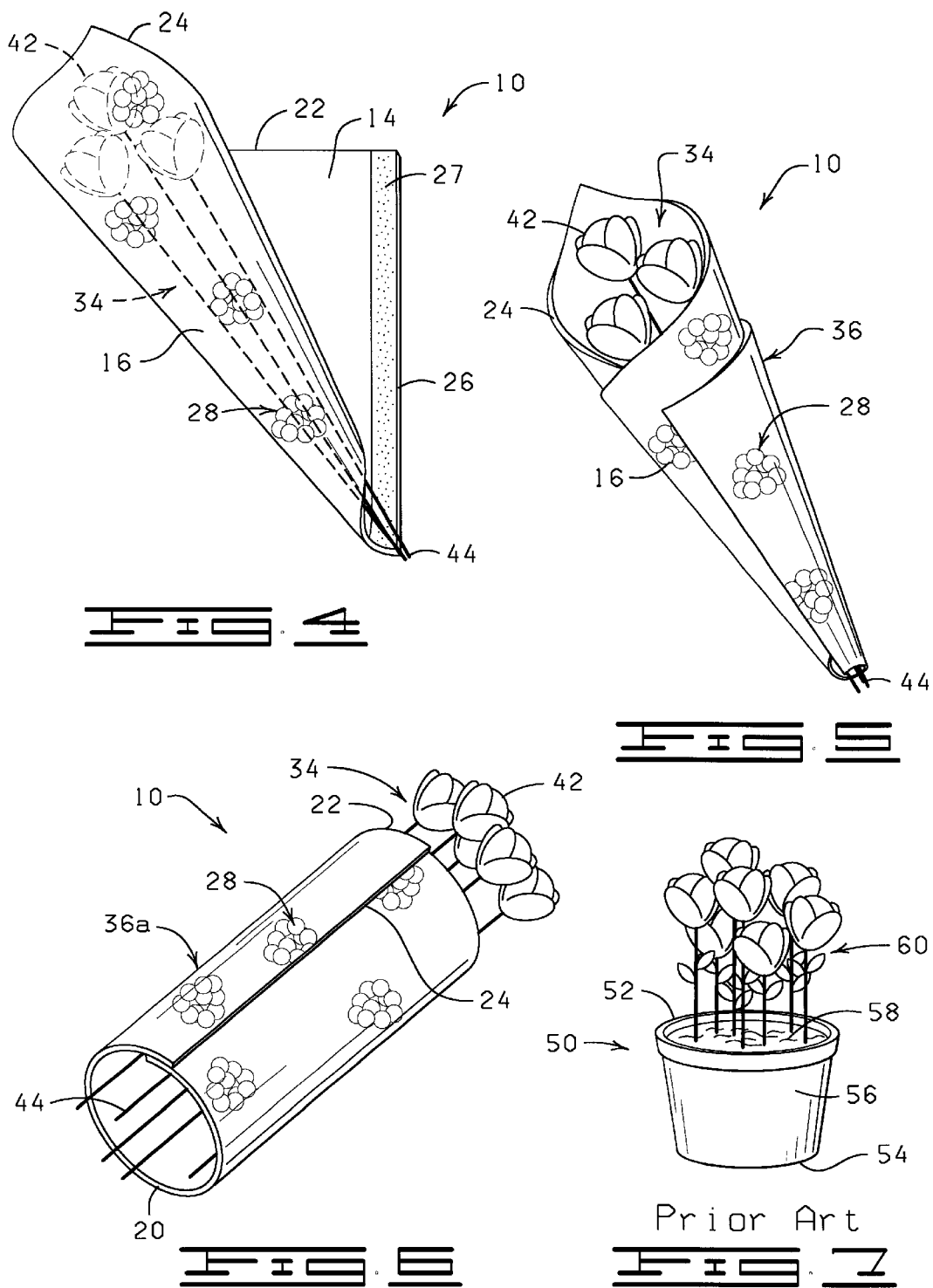

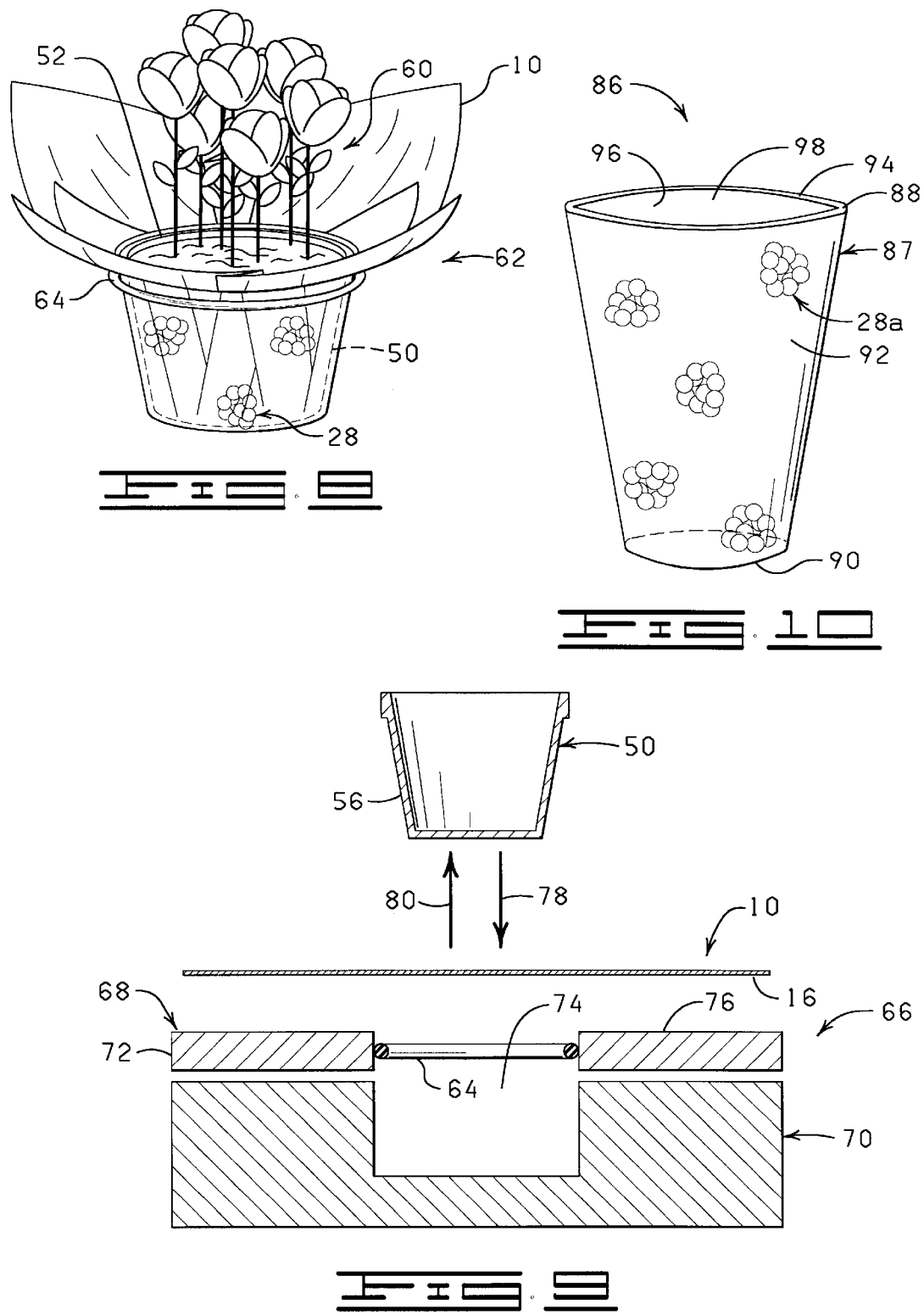

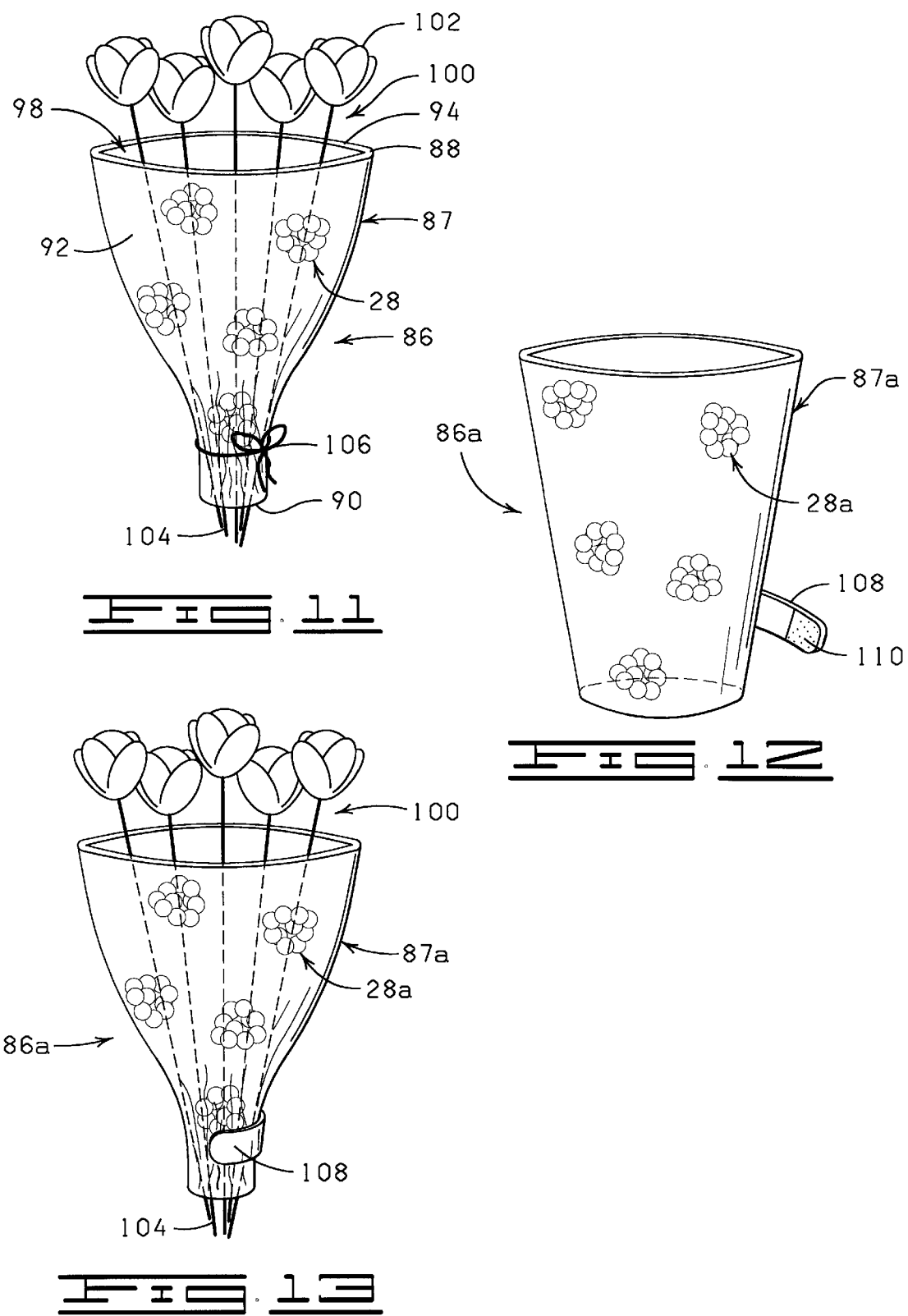

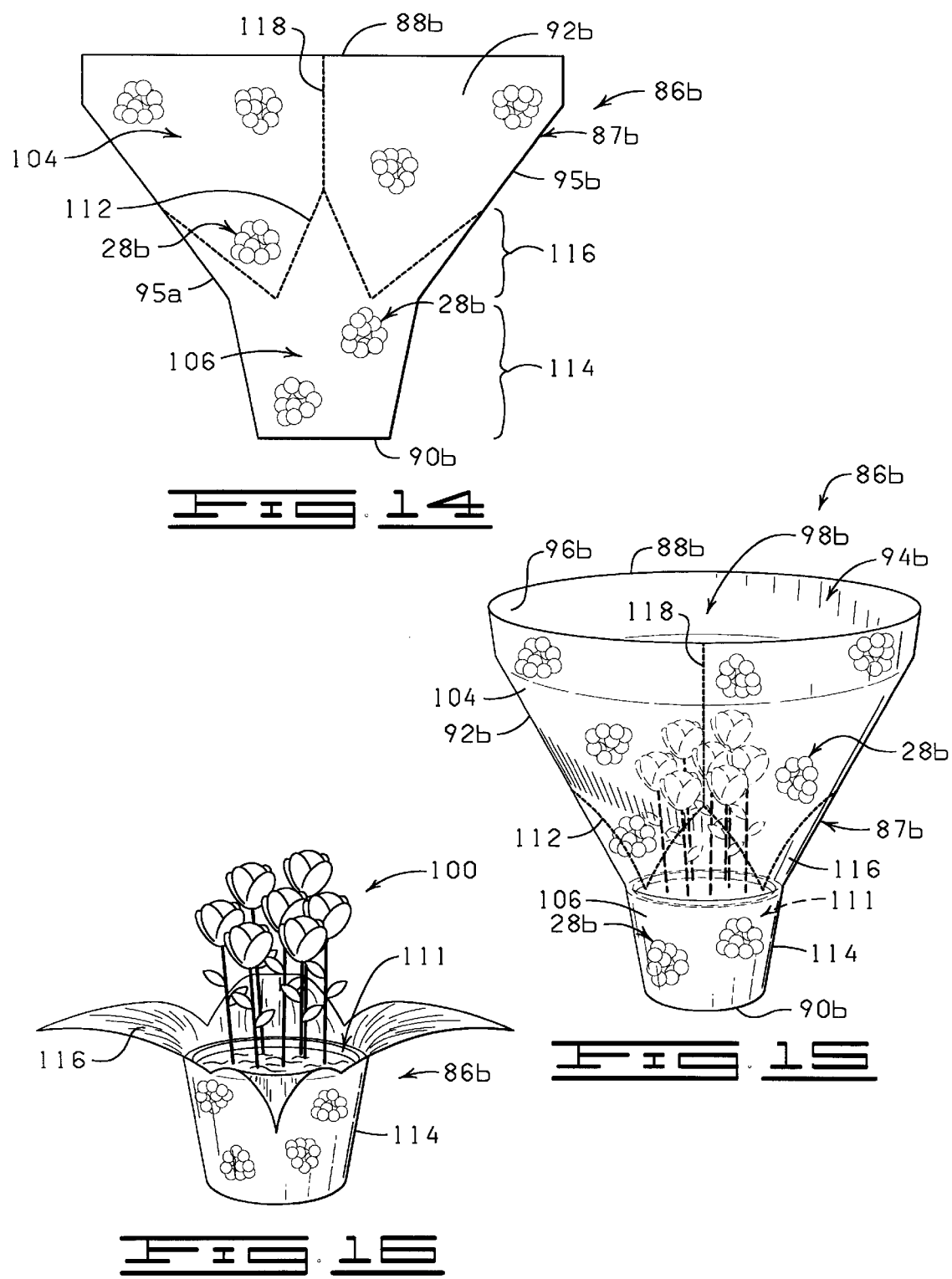

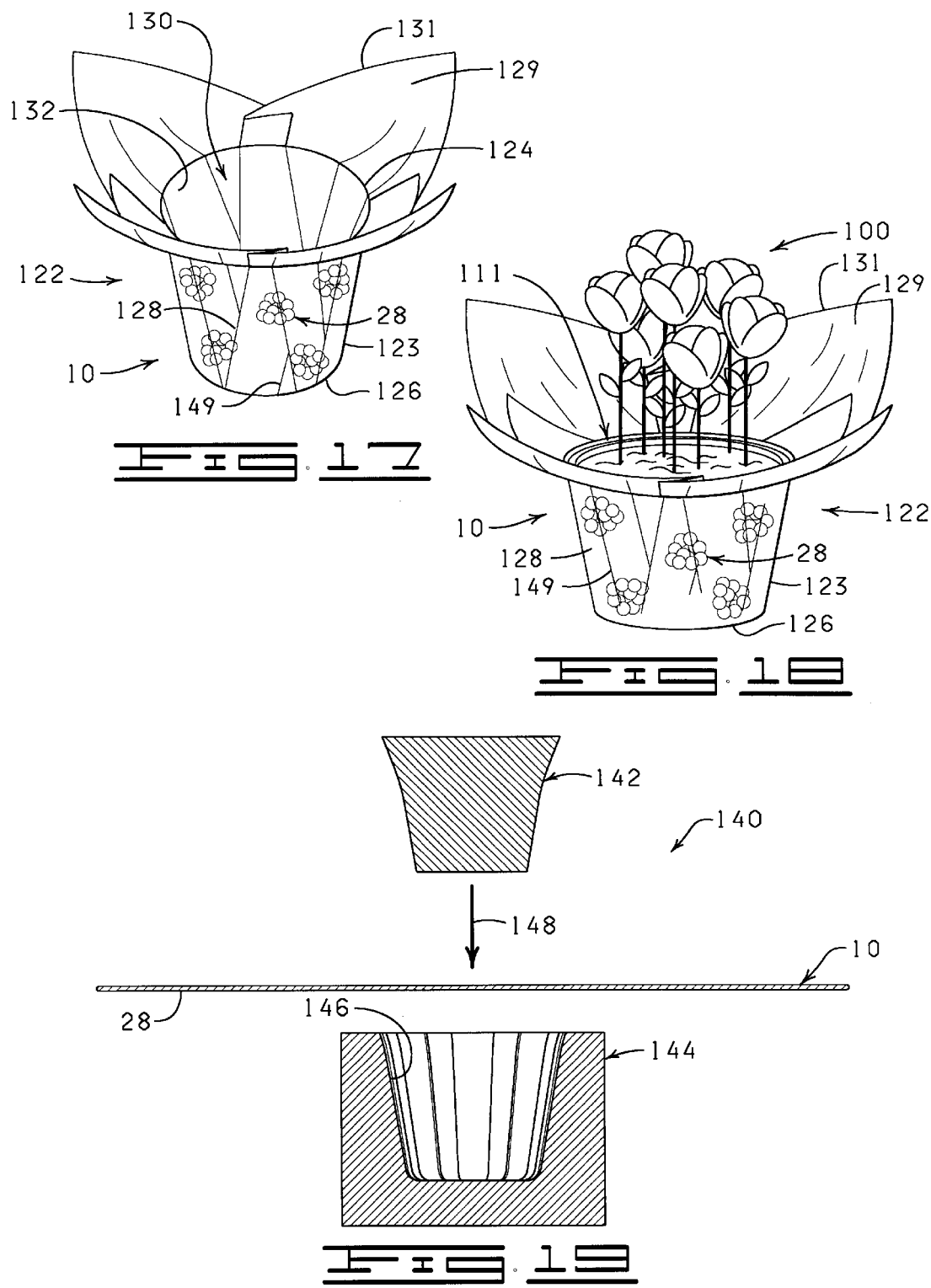

FLORAL WRAPPER HAVING PRINTED DESIGN WITH SHADED AND HIGHLIGHTED AREAS

CROSS REFERENCE TO RELATED APPLICATIONS

The present patent application is a continuation of U.S. Ser. No. 09/021,216, entitled "Floral Wrapper Having A Printed Design with Shaded and Highlighted Areas" which was filed on Feb. 10, 1988, (now abandoned) and which is hereby expressly incorporated herein by reference.

STATEMENT REGARDING FEDERALLY SPONSORED RESEARCH

Not applicable.

FIELD OF THE INVENTION

The present invention relates to methods of wrapping floral groupings and flower pots with a sheet of material to provide a decorative cover for such floral groupings and flower pots, and more particularly but not by way of limitation to methods of wrapping floral groupings and flower pots with a sheet of material having a printed pattern containing shaded and highlighted areas which provide the printed pattern with a visual perception of depth and thus a three dimensional appearance. In one aspect, the present invention relates to a sheet of material having a printed pattern thereon for providing a decorative sleeve, a preformed pot cover or a decorative cover for a flower pot or floral grouping wherein the printed pattern has shaded and highlighted areas which provide the printed design with a visual perception of depth.

BRIEF DESCRIPTION OF THE DRAWINGS

FIG. 1 is an enlarged, fragmental, perspective view of a sheet of material for providing a decorative cover for a floral grouping or a flower pot, a decorative sleeve or a preformed pot cover in accordance with the present invention, the sheet of material having a printed pattern thereon wherein the printed pattern contains shaded and highlighted areas which provide the printed pattern with a visual perception of depth and thus a three dimensional appearance.

FIG. 2 is a perspective view of the sheet of material of FIG. 1 having a floral grouping disposed thereon.

FIG. 3 is a perspective view of a sheet of material having a printed pattern containing shaded and highlighted areas (shown in FIG. 4) and having a bonding material disposed along one edge thereof and a floral grouping disposed on the sheet of material.

FIG. 4 is a perspective view of the floral grouping being wrapped with the sheet of material having a printed pattern containing shaded and highlighted areas of FIG. 3 by one method of wrapping the sheet of material about the floral grouping.

FIG. 5 is a perspective view of a decorative cover for the floral grouping formed from the sheet of material of FIG. 3 wherein the decorative cover formed from the sheet of material has a conical configuration.

FIG. 6 is a perspective view of a decorative cover formed from the sheet of material of FIG. 3 wherein the floral grouping is wrapped with the sheet of material by a second method of wrapping so that the decorative cover formed from the sheet of material has a substantially cylindrical configuration.

FIG. 7 is a perspective view of a flower pot containing a potted plant.

FIG. 8 is perspective view of a decorative cover positioned about the flower pot of FIG. 7 wherein the decorative cover is formed from a sheet of material having a printed pattern containing shaded and highlighted areas so as to provide the printed pattern with a visual perception of depth.

FIG. 9 is a cross-sectional view of a flower pot cover former and band applicator apparatus having the sheet of material of FIG. 2 disposed above an opening of the flower pot cover former and band applicator and having a flower pot disposed above the sheet of material.

FIG. 10 is a perspective view of a floral sleeve formed from a sheet of material having a printed pattern containing shaded and highlighted areas so as to provide the printed pattern with a visual perception of depth.

FIG. 11 is a perspective view of the floral sleeve of FIG. 10 disposed about a floral grouping.

FIG. 12 is a perspective view of a floral sleeve having a cinching member wherein the floral sleeve is formed from a sheet of material having a printed pattern containing shaded and highlighted areas so as to provide the printed pattern with a visual perception of depth.

FIG. 13 is a perspective view of the floral sleeve of FIG. 12 disposed about a floral grouping.

FIG. 14 is a side view of a sleeve having a detachable portion wherein the sleeve is formed from a sheet of material having a printed pattern having a three dimensional appearance which is created by shaded and highlighted areas in the printed pattern.

FIG. 15 is a perspective view of the sleeve of FIG. 14 having a flower pot disposed therein.

FIG. 16 is a perspective view of a flower pot disposed in the sleeve of FIG. 14 wherein an upper portion of the sleeve has been removed to provide a decorative cover having a skirt.

FIG. 17 is a perspective view of a preformed pot cover formed from a sheet of material having a printed pattern containing shaded and highlighted areas which produce a visual perception of depth and thus provides the printed pattern with a three dimensional appearance.

FIG. 18 is a perspective view of the preformed pot cover of FIG. 17 having a flower pot disposed therein.

FIG. 19 is a diagrammatic, cross-sectional view of a male and female mold having a sheet of material disposed therebetween for forming the preformed pot cover of FIG. 17.

DESCRIPTION

The present invention comprises methods of wrapping floral groupings, flower pots containing potted plants, or other pots with a sheet of material having a printed pattern thereon to provide a decorative cover or sleeve for such floral groupings, flower pots containing potted plants or other pot means wherein the printed pattern contains shaded and highlighted areas which provide the printed pattern with a visual perception of depth and thus a three dimensional appearance. In one aspect, the present invention comprises a sheet of material having a printed pattern thereon for providing a decorative cover for a floral grouping or a flower pot or other pots, a sleeve or a preformed pot cover wherein the printed pattern contains shaded and highlighted areas which provide the printed pattern with a visual perception of depth and thus a three dimensional appearance.

"Floral grouping" as used herein means cut fresh flowers, artificial flowers, a single flower or other fresh and/or artificial plants or other floral materials and may include other secondary plants and/or ornamentation or artificial or natural materials which add to the aesthetics of the overall floral grouping. Further, the "floral grouping" may comprise a growing potted plant having a root portion as well. However, it will be appreciated that the floral grouping may consist of only a single bloom or only foliage, or a botanical item (not shown), or a propagule. The term "floral grouping" may be used interchangeably herein with the term "floral arrangement". The term "floral grouping" may also be used interchangeably herein with the terms "botanical item" and/or "propagule."

The term "flower pot" as used herein refers to any type of container for holding a floral grouping, or a plant, or even another pot type container. Examples of flower pots and/or pot type containers include, but are not limited to, clay pots, wooden pots, plastic pots, pots made from natural mad/or synthetic fibers, or any combination thereof. Such flower pots and or pot-type containers are provided with a retaining space for receiving a floral grouping. The floral grouping may be disposed within the retaining space of the flower pot with a suitable growing medium described in further detail below, or other retaining medium, such as a floral foam. It will also be understood that in some cases the floral grouping, and any appropriate growing medium or other retaining medium, may be disposed in a sleeve formed from the sheet of material having the printed pattern printed thereon if the sleeve is adapted to contain a medium.

The term "growing medium" when used herein means any liquid, solid or gaseous material used for plant growth or for the cultivation of propagules, including organic and inorganic materials such as soil, humus, perlite, vermiculite, sand, water, and including the nutrients, fertilizers or hormones or combinations thereof required by the plants or propagules for growth.

The term "botanical item" when used herein means a natural or artificial herbaceous or woody plant, taken singularly or in combination. The term "botanical item" also means any portion or portions of natural or artificial herbaceous or woody plants including stems, leaves, flowers, blossoms, buds, blooms, cones, or roots, taken singularly or in combination, or in groupings of such portions such as bouquet or floral grouping.

The term "propagule" when used herein means any structure capable of being propagated or acting as an agent of reproduction including seeds, shoots, stems, runners, tubers, plants, leaves, roots or spores.

The term "polymer film" when used herein means a synthetically derived polymer, such as a polypropylene, or a naturally occurring polymer such as cellophane. A polymer film is relatively strong and not as subject to tearing (substantially non-tearable), as might be the case with paper or foil.

"Cling Wrap or Material" when used herein means any material which is capable of connecting to the sheet of material and/or itself upon contacting engagement during the wrapping process and is wrappable about an item whereby portions of the cling material contactingly engage and connect to other portions of another material, or, alternatively, itself, for generally securing the material wrapped about at least a portion of a flower pot. This connecting engagement is preferably temporary in that the material may be easily removed, i.e., the cling material "clings" to the flower pot.

The term "bonding material" when used herein can mean an adhesive, frequently a pressure sensitive adhesive, or a cohesive or any adhesive/cohesive combination, having adhesive qualities (i.e., qualities of adhesion or adhesion/cohesion, respectively) sufficient to cause the attachment of a portion of the sheet of material to itself, to a floral grouping, or to a flower pot. Since the bonding material may comprise either an adhesive or an adhesive/cohesive combination, it will be appreciated that both adhesives and cohesives are known in the art, and both are commercially available. When the bonding material is a cohesive, a similar cohesive material must be placed on the adjacent surface for bondingly contacting and bondingly engaging with the cohesive material. The term "bonding material" also includes materials which are heat sealable and, in this instance, the adjacent portions of the material must be brought into contact and then heat must be applied to effect the seal. The term "bonding material" also includes materials which are sonic sealable and vibratory sealable. The term "bonding material" when used herein also means a heat sealing lacquer or hot melt material which may be applied to the material and, in this instance, heat, sound waves, or vibrations, also must be applied to effect the sealing.

The term "bonding material [or bonding means]" when used herein also means any type of material or thing which can be used to effect the bonding or connecting of the two adjacent portions of the material or sheet of material to effect the connection or bonding described herein. The term "bonding material" may also include ties, labels, bands, ribbons, strings, tapes (including single or double-sided adhesive tapes), staples or combinations thereof. Some of the bonding materials would secure the ends of the material while other bonding material may bind the circumference of a wrapper, or a sleeve, or, alternatively and/or in addition, the bonding materials would secure overlapping folds in the material and/or sleeve. Another way to secure the wrapping and/or sleeve is to heat seal the ends of the material to another portion of the material. One way to do this is to contact the ends with an iron of sufficient heat to heat seal the material.

Alternatively, a cold seal adhesive may be utilized as the bonding material. The cold seal adhesive adheres only to a similar substrate, acting similarly as a cohesive, and binds only to itself. The cold seal adhesive, since it bonds only to a similar substrate, does not cause a residue to build up on equipment, thereby both permitting much more rapid disposition and use of such equipment to form articles and reducing labor costs. Further, since no heat is required to effect the seal, the dwell time, that is, the time for the sheet of material to form and retain the shape of an article, such as a flower pot cover or flower pot, is reduced. A cold seal adhesive binds quickly and easily with minimal pressure, and such a seal is not readily releasable. This characteristic is different from, for example, a pressure sensitive adhesive.

The term "bonding material" when used herein also means any heat or chemically shrinkable material, and static electrical or other electrical apparatus, chemical welding apparatus, magnetic apparatus, mechanical or barb-type fastening apparatus or clamps, curl-type characteristics of the film or materials incorporated in material which can cause the material to take on certain shapes, cling films, slots, grooves, shrinkable materials and bands, curl materials, springs, and any type of welding method which may weld portions of the material to itself or to the pot, or to both the material itself and the pot.

"Detaching element" as used herein, means any element, or combination of elements, or features, such as, but not by way of limitation, perforations, tear strips, zippers, and any other devices or elements of this nature known in the art, or any combination thereof. Therefore, while perforations are shown and described in detail herein, it will be understood that tear strips, zippers, or any other "detaching elements" known in the art, or any combination thereof, could be substituted therefor and/or used therewith.

Description of FIGS. 1–9

Referring now to FIGS. 1 and 2, designated generally by the reference numeral 10 is a sheet of material having an upper surface 14, a lower surface 16, and an outer peripheral edge 18. As shown in FIG. 2, the outer peripheral edge 18 of the sheet of material 10 comprises a first side 20, a second side 22, a third side 24, and fourth side 26. A bonding material 27 (FIGS. 3 and 4) may be disposed on at least a portion of one or both surfaces of the sheet of material 10, such as the upper surface 14 thereof as shown and as further illustrated in U.S. Pat. No. 5,181,364, the specification of which is hereby expressly incorporated herein by reference.

The sheet of material 10 has a printed pattern 28 on at least a portion of one of the upper or lower surfaces 14 and 16 thereof, such as the lower surface 16 as shown in FIGS. 1 and 4–6. The printed pattern 28, which contains shaded and highlighted areas so as to provide the printed pattern with a visual perception of depth and thus a three dimensional appearance, may be of any geometrical shape or design which will enhance the aesthetic qualities of a decorative cover 36 and 36a (FIGS. 5 and 6, respectively) formed from the sheet of material 10. That is, the printed pattern 28 may be a lace pattern, curlicues, paisleys, swirls, squiggles, and any shape generally associated with botanical items such as leaves, petals, stems, roots, fruits and any other biomorphic shapes.

The printed pattern 28 is produced by printing a web or sheet of material with different colors of ink so that at least one portion of the printed pattern 28 is printed in one color and other portions of the printed pattern 28, although arranged substantially in a two-dimensional arrangement are printed in different colors which results in the printed pattern 28 having the desired shaded and highlighted areas. By providing the printed pattern 28 with shaded and highlighted areas, the printed pattern 28 has a three dimensional appearance due to the depth perception created in the printed pattern 28 by the shaded and highlighted areas in the printed pattern 28. The printed pattern 28 may cover only a portion of the sheet of material 10, or may cover an entire surface of the sheet of material 10, or may cover all exposed and/or interior surfaces of the sheet of material 10.

The ink compositions applied to a web or sheet of material 10 to produce the sheet of material 10 having the printed pattern 28 containing shaded and highlighted areas can be any ink compositions, either solvent-based or water-based, which are compatible with the sheet of material 10. Such ink compositions are well known in the printing art. However, for environmental reasons it is preferred that the ink compositions be water-based ink compositions.

Water-based ink compositions which can be employed to produce the printed pattern 28 on the sheet of material 10, wherein the printed pattern 28 contains shaded and highlighted areas which create the desired visual perception of depth to the printed pattern 28, are disclosed in U.S. Pat. No. 5,594,048, the specification of which is hereby expressly incorporated in its entirety herein by reference.

The ink compositions may be applied to the sheet of material 10 in any conventional manner. The method of application may be manual or mechanical. If the material is in the form of a roll, then gravure, flexographic procedures, or Mayer rod procedures may be used to apply the ink compositions to the material which, when cut into sheets of material provide the sheets of material 10 having the printed pattern 28 thereon. The ink forming the printed pattern 28 is provided in a substantially two-dimensional arrangement.

The sheets of material 10 having the printed pattern 28 containing shaded and highlighted areas may then be employed to provide a decorative cover for a floral grouping 34 (FIGS. 5 and 6) or a decorative cover 62 for a flower pot (FIG. 8); or the sheet of material 10 may be employed to provide a sleeve 86, 86a for wrapping or covering a floral grouping (FIGS. 11 and 13) or a flower pot (FIGS. 15 and 16); or the sheet of material 10 may be employed to form a preformed flower pot cover 122 for covering a flower pot (FIGS. 17 and 18). The use of the sheet of material 10 having the printed pattern 28 to form a decorative cover for a floral grouping or a flower pot, to form a sleeve for a floral grouping or a flower pot, or to form a preformed flower pot cover will be described in more complete detail hereinafter.

As noted above, the sheet of material 10 having the printed pattern 28 containing shaded and highlighted areas which provide the printed pattern 28 with a visual perception of depth and thus a three dimensional appearance can be utilized to form a decorative cover for a floral grouping or a flower pot.

In the embodiments shown in the drawings, the sheet of material 10 having the printed pattern 28 thereon is a square sheet of material. It will be appreciated, however, that the sheet of material 10 having the printed pattern 28 can be of any shape, configuration or size as long as the sheet of material 10 is sufficiently sized and shaped to wrap and encompass a flower pot or a floral grouping. For example, the sheet of material 10 may have a rectangular, round, oval, octagonal or asymmetrical shape. Further, multiple sheets of material 10 may be used in a single circumstance to provide a decorative cover or sleeve for a flower pot or a floral grouping. Moreover, when multiple sheets of material 10 are used in combination, the sheets of material 10 need not be uniform in size or shape. Finally, it will be appreciated that the sheet of material 10 having the printed pattern 28 shown in all embodiments herein is a substantially flat sheet and the ink compositions applied to the sheet of material 10 are of substantially uniform thickness, whereby the shaded and highlighted areas of the printed pattern 28 are produced by the application of different colors of ink to create the visual perception of depth and thus the three dimensional appearance of the printed pattern 28.

Any thickness or stiffness of the sheet of material 10 may be utilized in accordance with the present invention as long as the sheet of material 10 having the printed pattern 28 containing shaded and highlighted areas printed thereon may be wrapped about at least a portion of a flower pot or a floral grouping, as described herein. Stiffer sheets of material 10 may be used if such stiffer sheets of material 10 are scored to facilitate folding. The sheet of material 10 preferably has a thickness of from about 0.1 mil to about 30 mil. Typically, the sheet of material 10 has a thickness in a range of about 0.5 mil to about 2.5 mil.

The sheet of material 10 is constructed from any suitable wrapping material that is capable of being wrapped about a flower pot or floral grouping. Preferably, the sheet of material 10 is paper (untreated or treated in any manner), cellophane, metal foil, polymer film, non-polymer film; fabric (woven or nonwoven or synthetic or natural), cardboard, burlap, or laminations or combinations thereof.

The sheet of material 10 may also be constructed, in whole or in part, from a cling material. The cling material is constructed and treated if necessary, from polyethylene such as Cling Wrap made by Glad®, First Brands Corporation, Danbury, Conn. The thickness of the cling material will, in part, depend upon the size of sleeve and the size of the flower pot in the sleeve, i.e., generally, a larger flower pot may require a thicker and therefore stronger cling material. The cling material will have a thickness of at least about 0.1 mil, and preferably a thickness of from about 0.5 mil to about 2.5 mil. However, any thickness of cling material may be utilized in accordance with the present invention which permits the cling material to be printed with ink compositions so as to provide the cling material with a printed pattern having shaded and highlighted areas which produce a visual perception of depth and thus a three dimensional appearance to the printed pattern.

In one embodiment, a sleeve may be constructed from two polypropylene films wherein at least a lower or outer surface of one of the sheets of polypropylene film is provided with a printed pattern having shaded and highlighted areas which provide the printed pattern with a three dimensional appearance due to the visual perception of depth created by the shaded and highlighted areas of the printed pattern. The sheets of polypropylene film having such printed pattern may be connected together or laminated or may be separate sheets. In an alternative embodiment, the sleeve may be constructed from only one sheet of polypropylene film having a printed pattern containing shaded and highlighted areas thereon.

The sheet of material 10 may vary in color. Further, the sheet of material 10 may comprise other decorative patterns or designs in addition to the printed pattern 28 which are printed, etched, and/or embossed thereon. In addition, the sheet of material 10 may have various colorings, coatings, flocking and/or metallic finishes, applied separately or simultaneously or may be characterized totally or partially by pearlescent, opaque, translucent, transparent, tinted, iridescent or the like, qualities. Each of the above-named characteristics may occur alone or in combination. Moreover, each surface of the sheet of material 10 may vary in the combination of such characteristics.

Referring more specifically to FIG. 3, the sheet of material 10 has a width 30 extending generally between the first side 20 and the second side 22; and a length 32 extending generally between the third side 24 and the fourth side 26. The sheet of material 10 is sufficiently sized so that the sheet of material 10 extends over a substantial portion of the floral grouping 34 when the sheet of material 10 has been wrapped about the floral grouping 34 in accordance with the present invention, as described in detail herein. The sheet of material 10 may also be wrapped about a flower pot to substantially wrap and cover the flower pot in accordance with the present invention.

A plurality of sheets of material 10 may be connected together to form a roll as is shown in U.S. Pat. No. 5,459,976, the specification of which is hereby expressly incorporated herein in its entirety by reference.

The wrapping of the sheet of material 10 having the printed pattern 28 thereon about the floral grouping 34 to provide a decorative cover 36 for the floral grouping 34 will now be described with reference to FIGS. 3–6. The three dimensional appearance of the printed pattern 28 is produced by application of ink compositions to the sheet of material 10 in such a manner that the printed pattern 28 is provided with shaded and highlighted areas which provide the printed pattern 28 with a perception of depth. The sheet of material 10 (which may optionally have the strip of bonding material 27 disposed upon the upper surface 14, the lower surface 16 or both, such as the strip of bonding material 27 disposed along at least a portion of the upper surface 14 so as to be disposed substantially adjacent the fourth side 26 of the sheet of material 10 as shown in FIGS. 3 and 4) is provided, either as an individual sheet or from a pad or roll, by any means or otherwise as described herein.

The bonding material 27, if present, may have a backing or release strip (not shown). The backing or release strip may be left applied for a period of time to the bonding material 27 after it is disposed on a surface of the sheet of material 10 prior to its use as a wrapping material, to protect the bonding qualities of the bonding strip. In operation, an operator may dispose the sheet of material 10 on a support surface (not shown), the lower surface 16 of the sheet of material 10 contacting the support surface.

Referring more specifically to FIG. 3, the floral grouping 34 is placed upon the upper surface 14 of the sheet of material 10 in a diagonal orientation. The floral grouping 34 has an upper bloom or foliage portion 42 and a lower stem portion 44.

As illustrated in FIGS. 4 and 5, the sheet of material 10 is then wrapped about the floral grouping 34 by the operator, the operator overlapping a portion of the sheet of material 10 over another portion of the sheet of material 10. That is, for example, the operator places the first side 20 of the sheet of material 10 over the floral grouping 34, as shown in FIG. 4. The operator continues to roll the floral grouping 34 and the sheet of material 10 in the direction toward the second side 22 of the sheet of material 10 until the upper surface 14 near second side 22 firmly engages the lower surface 16 of the sheet of material 10, whereby the floral grouping 34 is substantially encompassed by the sheet of material 10, and wherein the bonding material 27 contacts a portion of the overlapped sheet of material 10 to provide the decorative cover 36 which substantially encompasses and surrounds a substantial portion of the floral grouping 34. FIG. 5 shows the floral grouping 34 wrapped in a conical fashion with the bloom end 42 exposed near the open upper end of the decorative cover 36 and the stem end 44 exposed near the lower end of the decorative cover 36.

In another embodiment, illustrated in FIG. 6, the sheet of material 10 having the printed pattern 28 is utilized to wrap the floral grouping 34. The floral grouping 34 is disposed upon the sheet of material 10 approximately parallel to third side 24 of the sheet of material 10. The sheet of material 10 is then wrapped generally about the stem portion 44 of the floral grouping 34 to a position wherein the third side 24 of the sheet of material 10 generally overlaps the fourth side 26 of the sheet of material 10 in a cylindrical fashion. It should be noted that the sheet of material 10 may be wrapped a plurality of times about the stem portion 44 of the floral grouping 34 before the overlapping of the third side 24 and the fourth side 26 of the sheet of material 10. As before, the portion of the sheet of material 10 near the third side 26 is disposed generally adjacent another portion of the sheet of material 10 and the two adjacent portions then are brought into contact where they may be bondingly engaged, thereby securing the sheet of material 10 generally about the floral grouping 34 so as to provide a decorative cover 36a for the floral grouping 34.

In another embodiment of the invention, the sheet of material 10 having the printed pattern 28 thereon may be used to wrap a flower pot or pot-type container, as noted above. Shown in FIG. 7 is a flower pot designated by the reference numeral 50, which has an open upper end 52, a bottom end 54, an outer peripheral surface 56, and an inner retaining space 58 within which may be disposed a growing medium. The flower pot 50 may contain a botanical item, such as a plant 60.

The sheet of material 10 having the printed pattern 28 thereon may be wrapped about the flower pot 50 by any one of numerous methods used to wrap sheets of material about flower pots to form decorative pot covers for flower pots, such as a decorative cover 62 disposed about the flower pot 50 illustrated in FIG. 8. The sheet of material 10 may, for example, be formed by hand about the outer peripheral surface 56 (see FIG. 7) of the flower pot 50 to produce the decorative cover 62. The decorative cover 62 can then be secured about the flower pot 50 by a bonding material, such as elastic band 64, so that the open upper end 52 of the flower pot 50 remains substantially uncovered by the decorative cover 62.

Referring now to FIG. 9, a flower pot cover former and band applicator apparatus 66 for forming the sheet of material 10 into the decorative cover 62 for the flower pot 50 is illustrated. The flower pot cover former and band applicator device 66 comprises a band applicator 68 and a flower pot cover former 70. The flower pot cover former and band applicator device 66 has a support platform 72 with an opening 74 formed therein. A band, such as elastic band 64, is disposed circumferentially about the opening 74 in the support platform 72.

The lower surface 16 of the sheet of material 10 is positioned on an upper surface 76 on the support platform 72 such that the sheet of material 10 is positioned over the opening 74 in the support platform 72. The flower pot 50 is then positioned above the sheet of material 10 and is moved in a direction 78 into the opening 74 of the flower pot cover former and band applicator device 66. As the flower pot 50 is moved into the opening 74, the sheet of material 10 is pressed about the outer peripheral surface 56 of the flower pot 50 thereby forming the decorative cover 62 about the flower pot 50. The decorative cover 62 is then secured about the flower pot 50 by the elastic band 64. The flower pot 50 having the decorative cover 62 secured thereto is then moved in a direction 80 out of the opening 74 in the support platform 72.

The elastic band 64 can be applied manually or automatically such as by the method shown in U.S. Pat. No. 5,105,599, which is hereby incorporated herein by reference. The band 64 can be applied as a tie using a method such as described in U.S. Pat. No. 5,609,009, the specification of which is hereby incorporated herein by reference. The sheet of material 10 can be applied automatically about the flower pot 50, for example, by methods shown in U.S. Pat. Nos. 4,733,521 and 5,291,721, both of which are hereby incorporated herein by reference.

Instead of securing the decorative cover 62 about the flower pot 50 via the band 64, the decorative cover 62 formed from the sheet of material 10 may be secured to the flower pot 50 by the use of one or more bonding materials. For example, the upper surface 14 of the sheet of material 10 may have a bonding material disposed upon a portion thereof. When the sheet of material 10 is disposed about the flower pot 50, at least a portion of the upper surface 14 of the sheet of material 10 contacts the outer peripheral surface 56 of the flower pot 50 and is thereby bonded and held about the flower pot 50 via the bonding material.

The bonding material may cover a portion of the upper surface 14 of the sheet of material 10 or the bonding material may entirely cover the upper surface 14 of the sheet of material 10. The bonding material may be disposed on the upper surface 14 of the sheet of material 10 in the form of a strip or in the form of spaced-apart spots. One method for disposing a bonding material on the sheet of material 10 is described in U.S. Pat. No. 5,111,637, which is expressly incorporated herein by reference.

Description of FIGS. 10–16

Shown in FIG. 10 is a decorative cover designated therein by the general reference numeral 86 which comprises a flexible bag or sleeve 87 of unitary construction having a printed pattern 28a printed thereon in accordance with the present invention. The sleeve 87 may be used to provide the decorative cover 86 for a floral grouping or a flower pot. The sleeve 87 initially comprises a flexible flat collapsed piece of material which is openable in the form of a tube or sleeve. Such sleeves are well known in the floral industry. Further, in accordance with the present invention, the sleeve 87 has the printed pattern 28a, as previously described herein, printed upon at least a portion thereof. That is, the printed pattern 28a is provided with shaded and highlighted areas which produce a three dimensional appearing pattern due to the visual perception of depth created by the shaded and highlighted areas in the printed pattern 28a. The sleeve 87 has an upper end 88, a lower end 90 and an outer peripheral surface 92. The sleeve 87 may be tapered outwardly from the lower end 90 toward a larger diameter at its upper end 88. In its flattened state the sleeve 87 generally has an overall trapezoidal or modified trapezoidal shape and when opened is substantially frusto-conical to coniform. It will be appreciated, however, that the sleeve 87 may comprise variations on the aforementioned shapes or may comprise significantly altered shapes such as square or rectangular, wherein the sleeve 87 when opened has a cylindrical form, as long as the sleeve 87 functions in accordance with the present invention in the manner described herein. The sleeve 87 (or any other sleeve disclosed herein) may have an angular or contoured shape.

The sleeve 87 has an opening 94 at the upper end 88 and may be open at the lower end 90, or closed with a bottom at the lower end 90. The sleeve 87 also has an inner peripheral surface 96 which, when the sleeve 87 is opened, defines and encompasses an inner retaining space 98. When the lower end 90 of the sleeve 87 has a closed lower end 90, a portion of the lower end 90 may be inwardly folded to form one or more gussets (not shown) for allowing the lower portion of the inner retaining space 98 to be expandable, for example, for receiving the circular bottom of a pot or growing medium.

The sleeve 87 is generally frusto-conically shaped, but the sleeve 87 may be, by way of example but not by way of limitation, cylindrical, frusto-conical, a combination of both frusto-conical and cylindrical, or any other shape, as long as the sleeve 87 functions as described herein as noted above. Further, the sleeve 87 may comprise any shape, whether geometric, non-geometric, asymmetrical and/or fanciful as long as it functions in accordance with the present invention. The sleeve 87 may also be equipped with drain holes (if having a closed bottom) or side ventilation holes (not shown), or can be made from gas permeable or impermeable materials.

The material from which the sleeve 87 is constructed is the same as previously described above for the sheet of material 10. Such materials used to construct the sleeve 87 are further described in U.S. Pat. No. 5,111,637, which is expressly incorporated herein by reference. Any thickness of material may be utilized in accordance with the present invention as long as the sleeve 87 may be formed as described herein, and as long as the formed sleeve 87 may contain at least a portion of a flower pot or a floral grouping, as described herein. Additionally, an insulating material such as bubble film, preferable as one of two or more layers, can be utilized in order to provide additional protection for the item, such as the floral grouping, contained therein.

In FIG. 11 the sleeve 87 is illustrated having the printed pattern 28 printed on the outer peripheral surface 92 of the sleeve 87. A floral grouping 100 is disposed within the inner retaining space 98 of the sleeve 87. Generally, an upper or bloom portion 102 of the floral grouping 100 is exposed near the opening 94 of the sleeve 87 and a lower or stem portion 104 of the floral grouping 100 is exposed near the lower end 90 of the sleeve 87. Either end of the sleeve 87 may be closed about the floral grouping 100. Generally, a portion of the sleeve 87 is tightened about a portion of the stem portion 104 of the floral grouping 100 for holding the decorative cover 86 about the floral grouping 100. For example, the sleeve 87 may be held by a tie 106 tied about the sleeve 87 such as is shown in FIG. 11. Other means for binding a sleeve about a floral grouping may be employed such as the bonding means and materials described elsewhere herein.

Similarly, it may generally be desired to use the sleeve 87 as a decorative cover for a flower pot (not shown). The flower pot will generally contain a botanical item or plant. The flower pot can be deposited into the open sleeve 87 in a manner well known in the art, such as manually wherein the sleeve 87 is opened by hand and the flower pot deposited therein.

As noted above, a bonding material may be disposed on a portion of the sleeve 87 or any sleeve described herein to assist in holding the sleeve 87 to the flower pot when the flower pot is disposed within the sleeve 87 or to assist in closing the upper end 88 of the sleeve 87 or adhering the sleeve 87 to the flower pot after the flower pot has been disposed therein, as will be discussed in further detail below.

It will be understood that the bonding material, if present, may be disposed as a strip or block on a surface of the sleeve 87. The bonding material may also be disposed upon either the outer peripheral surface 92 or the inner peripheral surface 96 of the sleeve 87, as well as upon the flower pot. Further, the bonding material may be disposed as spots of bonding material, or in any other geometric, non-geometric, asymmetric, or fanciful form, and in any pattern including covering either the entire inner peripheral surface 96 and/or outer peripheral surface 92 of the sleeve 87 and/or the flower pot. The bonding material may be covered by a cover or release strip which can be removed prior to the use of the sleeve 87 or flower pot. The bonding material can be applied by means known to those of ordinary skill in their art. One method for disposing a bonding material, in this case an adhesive, is described in U.S. Pat. No. 5,111,637, which is hereby incorporated herein by reference.

As noted above, a bonding material may be disposed on at least a portion of the inner peripheral surface 96 of the sleeve 87 (or any other sleeve described herein), or, alternatively, the bonding material may be disposed on the outer peripheral surface 56 (see FIG. 7) of a flower pot contained within the sleeve 87, while the sleeve 87 may be free of the bonding material. In a further alternative, the bonding material may be disposed both on at least a portion of the flower pot as well as upon at least a portion of the inner peripheral surface 96 of the sleeve 87. In addition, a portion of the bonding material may also be disposed on the outer peripheral surface 92 of the sleeve 87 as well. It will be understood that the bonding material may be disposed in a solid section of bonding material. The bonding material, when present, is disposed on the sleeve 87 and/or flower pot by any means known in the art.

Certain embodiments of sleeves described herein may be used in combination with a preformed pot cover. For example, a preformed pot cover may be applied to the pot, then the covered pot wrapped or disposed within a sleeve. Either the cover, the sleeve, or both, may have the printed pattern printed thereon wherein the printed pattern is produced by application of ink compositions to the sheet of material 10 or the sleeve 87 in such a manner that the printed pattern 28 or 28a is provided with shaded and highlighted areas which provide the printed pattern 28 or 28a with a perception of depth.

As shown in FIG. 12, a decorative cover 86a is provided which comprises a sleeve 87a having the printed pattern 28a printed thereon. The sleeve 87a is further provided with a cinching tab 108 having a bonding material 110 disposed upon a surface thereof. The cinching tab 108 can be used to gather portions of the sleeve 87a together about the stem portion 104 of the floral grouping 100 as shown in FIG. 13 for holding the sleeve 87a tightly about the floral grouping 100.

Examples of sleeves which may be used in the practice of the present invention are disclosed in U.S. Pat. No. 5,625,979, which is expressly incorporated herein by reference in its entirety. Equipment and devices for forming sleeves are commercially available, and well known in the art.

Shown in FIGS. 14 and 15 is another embodiment of a decorative cover 86b which comprises a sleeve 87b constructed in accordance with the present invention. The sleeve 87b has a printed pattern 28b printed thereon; and the sleeve 87b has a "detaching" element 112 in predetermined areas for detaching a portion of the sleeve 87b. The sleeve 87b generally initially comprises a flexible, flat, collapsed piece of material which is openable in the form of a tube or sleeve. The sleeve 87b is constructed of the same material and in the same way as described previously herein and may be described exactly the same as the other sleeves described herein except for the additional elements described herein.

The sleeve 87b has an upper end 88b, a lower end 90b, and an outer peripheral surface 92b. The sleeve 87b has an opening 94b at the upper end 88b thereof, and the sleeve 87b may be open at the lower end 90b or closed with a bottom at the lower end 90b. In a flattened state, the sleeve 87b has a first side 95a and a second side 95b. The sleeve 87b also has an inner peripheral surface 96b which, when the sleeve 87b is opened, defines and encompasses an inner retaining space 98b as shown in FIG. 15. When the lower end 90b of the sleeve 87b has a closed bottom, a portion of the lower end 90b may be inwardly folded to form one or more gussets (not shown) for permitting a circular bottom of an object, such as a flower pot 111 (see FIG. 16), to be disposed in the inner retaining space 98b of the lower end 90b of the sleeve 87b.

As shown in FIGS. 14 and 15, the sleeve 87b is demarcated into an upper portion 104 and a lower portion 106. The lower portion 106 of the sleeve 87b is generally sized to contain the flower pot 111. The upper portion 104 of the sleeve 87b is sized to substantially surround and encompass a plant 100 contained in the flower pot 111 disposed within the lower portion 106 of the sleeve 87b. The sleeve 87b is demarcated into the upper portion 104 and the lower portion 106 by a detaching element 112 for enabling the detachment of the upper portion 104 of the sleeve 87b from the lower portion 106 of the sleeve 87b. In the present embodiment, the detaching element 112 is a plurality of generally laterally-oriented or alternately diagonally-oriented perforations which extend circumferentially across the outer peripheral surface 92b of the sleeve 87b from the first side 95a to the second side 95b.

In a preferred embodiment, as shown in FIGS. 14 and 15, the lower portion 106 of the sleeve 87b further comprises a base portion 114 and a skirt portion 116. The base portion 114 comprises that part of the lower portion 106 which, when the flower pot 111 is placed into the lower portion 106, has an inner peripheral surface which is substantially adjacent to and surrounds the outer peripheral surface of the flower pot 111. The skirt portion 116 comprises that part of the lower portion 106 which extends beyond an open upper end of the flower pot 111 and adjacent at least a portion of the plant 100 contained within the flower pot 111 and which is left to freely extend at an angle, inwardly or outwardly, from the base portion 114 when the upper portion 104 of the sleeve 87b is detached from the lower portion 106 of the sleeve 87b by actuation of the detaching element 112.

In the intact sleeve 87b, the skirt portion 116 comprises an upper peripheral edge congruent with the detaching element 112 which is connected to a lower peripheral edge, also congruent with the detaching element 112, of the upper portion 104 of the sleeve 87b. In FIGS. 14 and 15, the upper peripheral edge of the skirt portion 116 is congruent with a series of alternating diagonally-oriented lines of perforations which together form a zig-zag and comprise the detaching element 112. The upper portion 104 of the sleeve 87b may also have an additional detaching element 118 indicated as a plurality of vertical perforations for facilitating removal of the upper portion 104 and which are disposed more or less vertically therein extending between the detaching element 112 and the upper end 88b of the sleeve 87b.

The upper portion 104 of the sleeve 87b is thereby separable from the lower portion 106 of the sleeve 87b by tearing the upper portion 104 along both the vertical perforations 118 and the detaching element 112, thereby separating the upper portion 104 from the lower portion 106 of the sleeve 87b. The lower portion 106 of the sleeve 87b remains disposed as the base portion 114 about the flower pot 111, and as the skirt portion 116 about the plant 100 forming a decorative cover 86b as shown in FIG. 16 which substantially surrounds and encompasses the flower pot 111 and the plant 100 contained therein. The printed pattern 28b, which has shaded and highlighted areas so as to provide the printed pattern 28b with a visual perception of depth and thus provides a three dimensional appearance, may be printed upon only the lower portion 106 of the sleeve 87b, for example, the base and skirt portions 114 and 116, while the upper portion 104 is left unprinted or is printed with another design. When the upper portion 104 is detached, the portion containing the printed pattern 28b remains.

In a general method of use of sleeve 87b as a decorative cover for a flower pot, an operator provides the sleeve 87b and the flower pot 111 having a plant 100 disposed in a growing medium contained within the flower pot 111. The operator then disposes the flower pot 111 having the plant 100 contained therein into the sleeve by opening the sleeve 87b at its upper end 88b and assuring both that the opening 94b therein is in an open condition, and that the inner peripheral surface 96b of the sleeve 87b is somewhat expanded outward as well, as shown in FIG. 15. The operator then manually or automatically disposes the flower pot 111 into the opening 94b in the sleeve 87b, the flower pot 111 being disposed generally through the upper portion 104 of the sleeve 87b into generally the lower portion 106 of the sleeve 87b, the flower pot 111 remaining in the lower portion 106 of the sleeve 87b, permitting the sleeve 87b to substantially surround and tightly encompass the flower pot 111. It will be understood that, alternatively, the sleeve 87b with an extension (not shown) may be utilized, the sleeve 87b being disposed on rods, or wickets (not shown) and the flower pot 111 then being disposed in the sleeve 87b either before or after the sleeve 87b has been removed from the wickets.

Embodiments of FIGS. 17–18

Referring now to FIGS. 17 and 18, a decorative preformed flower pot cover 122 is illustrated constructed from a sheet of material 10 having the printed pattern 28 thereon. As previously described with reference to FIGS. 1 and 2, the printed pattern 28 is produced by application of ink to the sheet of material 10 such that the printed pattern 28 is provided with a three dimensional appearance as a result of a perception of depth created by shaded and highlighted areas created in the printed pattern 28.

The decorative preformed pot cover 122 has a base 123 with an upper end 124, a lower end 126, and an outer peripheral surface 128. A skirt 129 is connected to the upper end 124 of the base 123 so as to extend outwardly from the upper end 124 of the base 123 and terminating with an outer periphery 131. An opening 130 intersects the upper end 124, forming an inner peripheral surface 132 which defines and encompasses a retaining space within which the flower pot 111 containing the floral grouping or plant 100 may be disposed in a manner well known in the art and which is shown in FIG. 18.

The decorative preformed flower pot cover 122 may be constructed of a single sheet of material 10 having the printed pattern 28 printed thereon substantially as shown in FIG. 18, or a plurality of layers of the same and/or different types of material may be employed in the formation of the decorative preformed flower pot cover 122. The thickness of the sheet of material 10 may vary widely and any thickness of the sheet of material 10 may be utilized in accordance with the present invention so long as the sheet of material 10 is formable into the decorative preformed flower pot cover 122 as described herein. When the sheet of material 10 is constructed of a plurality of layers of material, each layer of material may be connected to an adjacent layer of material via a bonding material.

Referring now to FIG. 19, the decorative preformed flower pot cover 122 may be formed using a conventional mold system 140 comprising a male mold 142 and a female mold 144 having a mold cavity 146 for matingly receiving the male mold 142. The sheet of material 10 having the printed pattern 28 printed thereon is positioned between the male and female molds 142 and 144, respectively. Movement of the male mold 142 in the direction 148 and into the mold cavity 146 forces the sheet of material 10 to be disposed about the portion of the male mold 142 disposed in the mold cavity 146 of the female mold 144 and thereby forms the sheet of material 10 into the preformed decorative flower pot cover 122 (FIG. 18)

Methods for forming such preformed decorative pot covers are well known in the art. Two methods of forming such covers are described in U.S. Pat. Nos. 4,773,182 and 5,291,721, each of which is expressly incorporated herein by reference. It will be noted that in one preferred embodiment, overlapping folds 149 (see FIGS. 17 and 18) are provided and a portion of the overlapping folds 149 can be connected, such as by an application of the bonding material 27, as discussed above, to the sheet of material 10 before forming the sheet of material 10 by way of the conventional mold system 140.

Further, in accordance with the present invention, the preformed flower pot cover 122 is constructed from the same materials described hereinabove, may have a bonding material disposed upon a portion thereof, and has printed upon at least a portion thereof the printed pattern 28 described in detail above.

Changes may be made in the construction and the operation of the various components, elements and assemblies described herein or in the steps or the sequence of steps of the methods described herein without departing from the spirit and scope of the invention as defined in the following claims.

What is claimed:

1. A method for providing a decorative cover about a floral grouping, comprising:

providing a sheet of material having ink arranged substantially in a two-dimensional arrangement to provide a printed pattern thereon, the printed pattern having shaded and high-lighted areas to provide the printed pattern with a visual perception of depth and thus a three dimensional appearance;

providing a floral grouping having a bloom end and a stem end; and wrapping the sheet of material having the printed pattern thereon about the floral grouping to provide the decorative cover for the floral grouping.

2. The method of claim 1 wherein the step of providing the sheet of material, the sheet of material is further defined as having a thickness of from about 0.1 mil to about 30 mils.

3. The method of claim 1 wherein the step of providing the sheet of material, the sheet of material is further defined as having a thickness of from about 0.5 mil to about 2.5 mils.

4. The method of claim 1 wherein, in the step of providing the sheet of material, the sheet of material is further defined as constructed from a material selected from the group consisting of paper, cellophane, metal foil, polymer film, non-polymer film, cloth, burlap, and laminations or combinations thereof.

5. The method of claim 1 wherein, in the step of providing the sheet of material, the sheet of material is further characterized as having bonding means disposed on at least a portion thereof for bondingly holding the decorative cover produced from the sheet of material about the floral grouping.

6. The method of claim 1 wherein, in the step of providing the sheet of material, the sheet of material is further defined as having a portion which is selectively detachable.

7. A method for packaging a floral grouping comprising the steps of:

providing a sheet of material having an upper surface, a lower surface and ink arranged substantially in a two-dimensional arrangement to provide a printed pattern on at least the lower surface, the printed pattern having shaded and high-lighted areas to provide the printed pattern with a three dimensional appearance due to the visual perception of depth created by the shaded and highlighted areas of the printed pattern;

providing a floral grouping having an upper end consisting of a bloom end and a lower end consisting of a stem portion;

placing the floral grouping on the upper surface of the sheet of material; and wrapping the sheet of material about the floral grouping to provide a decorative cover for the floral grouping wherein the printed pattern provides a visual perception of depth and thereby provides a decorative cover having a three dimensional effect, the decorative cover substantially encompassing and surrounding a substantial portion of the floral grouping.

8. The method of claim 7 wherein the step of providing the sheet of material, the sheet of material is further defined as having a thickness of from about 0.1 mil to about 30 mils.

9. The method of claim 7 wherein the step of providing the sheet of material, the sheet of material is further defined as having a thickness of from about 0.5 mil to about 2.5 mils.

10. The method of claim 7 wherein, in the step of providing the sheet of material, the sheet of material is further defined as constructed from a material selected from the group consisting of paper, cellophane, metal foil, polymer film, non-polymer film, cloth, burlap, and laminations or combinations thereof.

11. The method of claim 7 wherein, in the step of providing the sheet of material, the sheet of material is further characterized as having bonding means disposed on at least a portion thereof for bondingly holding the decorative cover produced from the sheet of material about the floral grouping.

12. The method of claim 7 wherein, in the step of providing the sheet of material, the sheet of material is further defined as having a portion which is selectively detachable.

13. A method for packaging an item, comprising the steps of:

providing a sheet of material having a first side and a second side, a third side and a fourth side, an upper surface and a lower surface, the sheet of material having ink compositions arranged substantially in a two-dimensional arrangement on one of the surfaces to provide a printed pattern thereon wherein the pattern is produced by application of the ink compositions to the sheet of material so as to provide shaded and high-lighted areas in the printed pattern and thereby provide the printed pattern with a three dimensional appearance due to the visual perception of depth created by the shaded and highlighted areas of the printed pattern;

providing a floral grouping having an upper end consisting of a bloom end and a lower end consisting of a stem portion having a stem end, the floral grouping comprising the item;

placing the floral grouping on the sheet of material having the printed pattern thereon;

wrapping the sheet of material about the floral grouping with the first side of the sheet of material overlapping portions of the sheet of material so that the sheet of material having the printed pattern thereon substantially encompasses and surrounds a substantial portion of the stem portion of the floral grouping, the sheet of material wrapped about the floral grouping forming a conically shaped decorative cover having the printed pattern with a three dimensional appearance due to the visual perception of depth created by the shaded and highlighted areas of the printed pattern and the decorative cover further having an opening extending through a lower end thereof and an opening extending through an upper end thereof with the stem end of the floral grouping extending through the opening in the lower end of the decorative cover and the bloom end of the floral grouping being exposed near the opening in the upper end of the decorative cover.

14. The method of claim 13 wherein, in the step of providing the sheet of material, the sheet of material is further defined as constructed from a material selected from the group consisting of paper, cellophane, metal foil, polymer film, non-polymer film, cloth, burlap, and laminations or combinations thereof.

15. The method of claim 14 wherein the step of providing the sheet of material, the sheet of material is further defined as having a thickness of from about 0.1 mil to about 30 mils.

16. The method of claim 15 wherein, in the step of providing the sheet of material, the sheet of material is further characterized as having bonding means disposed on at least a portion thereof for bondingly holding the decorative cover produced from the sheet of material about the floral grouping.

17. The method of claim 16 wherein, in the step of providing the sheet of material, the sheet of material is further defined as having a portion which is selectively detachable.

18. The method of claim 14 wherein the step of providing the sheet of material, the sheet of material is further defined as having a thickness of from about 0.5 mil to about 2.5 mils.

19. A method for packaging an item comprising the steps of:

providing a sheet of material having a first side and a second side, a third side and a fourth side, an upper surface and a lower surface, the sheet of material having ink compositions arranged substantially in a two-dimensional arrangement on one of the surfaces to provide a printed pattern thereon wherein the printed pattern has a visual perception of depth created by the shaded and highlighted areas in the printed pattern produced by application of the ink compositions to the sheet of material;

providing a floral grouping having a bloom end and a stem portion, the stem portion having a lower stem end, the floral grouping comprising the item;

placing the floral grouping on the sheet of material;

wrapping the sheet of material having the three-dimensional printed pattern thereon about the floral grouping with the first side of the sheet of material overlapping portions of the sheet of material so that the sheet of material substantially encompasses and surrounds a substantial portion of the bloom end of the floral grouping and a substantial portion of the stem portion of the floral grouping, the sheet of material being tightly wrapped about the stem portion of the floral grouping, the sheet of material wrapped about the floral grouping forming a conically shaped decorative cover having at least a portion of the printed pattern having a three dimensional appearance due to the visual perception of depth created by the shaded and highlighted areas of the printed pattern, the decorative cover further having an opening extending through a lower end thereof and an opening extending through an upper end thereof with the lower stem end of the stem portion of the floral grouping extending through the opening in the lower end of the decorative cover and the bloom end of the floral grouping being exposed near the opening in the upper end of the decorative cover, the upper end of the decorative cover being loosely wrapped about the bloom end of the floral grouping.

20. The method of claim 19 wherein the step of providing the sheet of material is defined further as providing the sheet of material having a thickness in a range of from about 0.1 mil to about 30 mils.

21. The method of claim 20 wherein, in the step of providing the sheet of material, the sheet of material is further defined as constructed from a material selected from the group consisting of paper, cellophane, metal foil, polymer film, non-polymer film, cloth, burlap, and laminations or combinations thereof.

22. The method of claim 19 wherein the step of providing the sheet of materials is defined further as providing the sheet of material having a thickness in a range of from about 0.5 mil to about 2.5 mils.

23. A method for packaging an item comprising the steps of:

providing a sheet of material having a third side and a fourth side, an upper surface and a lower surface, the sheet of material having a plurality of colored ink compositions arranged substantially in a two-dimensional arrangement to provide a printed pattern thereon having a three dimensional appearance due to a visual perception of depth created by shaded and highlighted areas of the printed pattern produced by application of the plurality of colored ink compositions to the sheet of material;

providing a floral grouping having an upper end consisting of a bloom end and a lower end consisting of a stem portion, the floral grouping comprising the item;

placing the floral grouping on the sheet of material;

wrapping the sheet of material having the printed pattern thereon about the floral grouping with a portion of the sheet of material overlapping other portions of the sheet of material so that the sheet of material substantially encompasses and surrounds a substantial portion of the bloom end and a substantial portion of the stem portion of the floral grouping, the sheet of material being tightly wrapped about the stem portion of the floral grouping and the sheet of material being loosely wrapped about the floral grouping so as to form a conically shaped decorative cover having the printed pattern with a three dimensional appearance due to the visual perception of depth created by the shaded and highlighted areas of the printed pattern, the decorative cover further having an opening extending through a lower end thereof and an opening extending through an upper end thereof with a portion of the stem portion of the floral grouping extending through the opening in the lower end of the conical shaped decorative cover and the bloom end of the floral grouping being exposed near the opening in the upper end of the conical shaped decorative cover.

24. The method of claim 23 wherein the step of providing the sheet of material is defined further as providing the sheet of material having a thickness in a range of from about 0.1 mil to about 30 mils.

25. The method of claim 24 wherein, in the step of providing the sheet of material, the sheet of material is further characterized as having bonding means disposed on at least a portion thereof for bondingly holding the decorative cover produced from the sheet of material about the floral grouping.

26. The method of claim 25 wherein, in the step of providing the sheet of material, the sheet of material is further defined as constructed from a material selected from the group consisting of paper, cellophane, metal foil, polymer film, non-polymer film, cloth, burlap, and laminations or combinations thereof.

27. The method of claim 23 wherein the step of providing the sheet of material is defined further as providing the sheet of material having a thickness in a range of from about 0.5 mil to about 2.5 mils.

28. A method for packaging an item comprising:

providing a sheet of material having a third side, a fourth side, an upper surface and a lower surface, the sheet of material having a three dimensional appearing printed pattern thereon wherein the three dimensional appearing printed pattern is produced by application of a plurality of different colors of ink in a substantially two-dimensional arrangement of the ink to produce shaded and highlighted areas in the printed pattern which create a perception of depth and thus produce the three dimensional appearance to the printed pattern;

providing a floral grouping having a bloom end and a stem end, the floral grouping comprising the item; and wrapping the sheet of material having the three dimensional appearing printed pattern thereon about the floral grouping with a portion of the sheet of material overlapping other portions of the sheet of material generally between the first and the second ends of the sheet of material and with the sheet of material substantially encompassing and surrounding a substantial portion of the stem end of the floral grouping, the sheet of material wrapped about the floral grouping forming a decorative cover having an opening extending through an upper end thereof and the bloom end of the floral grouping being exposed near the opening in the upper end thereof.

29. The method of claim 28 wherein the step of providing the sheet of material is defined further as providing the sheet of material having a thickness in a range of from about 0.1 mil to about 30 mils.

30. The method of claim 28 wherein the step of providing the sheet of material is defined further as providing the sheet of material having a thickness in a range of from about 0.5 mil to about 2.5 mils.

31. The method of claim 28 wherein the step of providing the sheet of material is defined further to include the steps of:

providing a roll of material, the roll of material having a three-dimensional printed pattern thereon wherein the three-dimensional pattern is produced by application of a foamable ink composition to the roll of material;

unrolling material from the roll of material until a predetermined amount of material has been unrolled from the roll of material; and cutting the unrolled material from the roll of material to provide the sheet of material having the three-dimensional printed pattern thereon.

32. A method for packaging an item comprising the steps of:

providing a sheet of material having a third side and a fourth side, an upper surface and a lower surface, the sheet of material having a three dimensional appearing printed pattern thereon wherein the three dimensional appearing printed pattern is produced by application of ink compositions to the sheet of material in a substantially two-dimensional arrangement of the ink compositions to produce the printed pattern having shaded and highlighted areas which provide the printed pattern with a perception of depth and thus the three dimensional appearance to the printed pattern;

providing a floral grouping having a stem end and a bloom end, the floral grouping comprising the item; and wrapping the sheet of material having the three dimensional appearing printed pattern thereon about the floral grouping with a portion of the sheet of material overlapping other portions of the sheet of material whereby there are no loose flaps formed by the sheet of material, and with the sheet of material substantially encompassing and surrounding a substantial portion of the bloom end of the floral grouping and a substantial portion of the stem end of the floral grouping, the sheet of material being wrapped about the stem end of the floral grouping and the bloom end of the floral grouping so as to form a decorative cover having an opening extending through an upper end thereof with the flower end of the floral grouping being exposed near the opening in the upper end of the decorative cover.

33. The method of claim 32 wherein the step of providing the sheet of material is defined further as providing the sheet of material having a thickness in a range of from about 0.1 mil to about 30 mils.

34. The method of claim 32 wherein the step of providing the sheet of material is defined further as providing the sheet of material having a thickness in a range of from about 0.5 mil to about 2.5 mils.

35. The method of claim 32 wherein the step of providing the sheet of material is defined further to comprise the steps of:

providing a roll of the material, the roll of material having a three dimensional appearing printed pattern thereon wherein the three dimensional appearing printed pattern is produced by application of ink compositions to the roll of material to produce the printed pattern having shaded and highlighted areas which provide the printed pattern with a perception of depth and thus the three dimensional appearance;

unrolling material from the roll of material until a predetermined amount of material has been unrolled from the roll of material; and cutting the unrolled material from the roll of material to provide the sheet of material having the three dimensional appearing printed pattern thereon.

36. A method for packaging an item comprising the steps of:

providing a sheet of material having a third side and a fourth side, an upper surface and a lower surface, the sheet of material having a printed pattern thereon wherein the printed pattern is produced by application of a plurality of different colored ink compositions to the sheet of material in a substantially two-dimensional arrangement of the ink compositions to provide the printed pattern with a three dimensional appearance due to a visual perception of depth created by shaded and highlighted areas of the printed pattern;

providing a floral grouping having a bloom end and a stem end, the floral grouping comprising the item; and wrapping the sheet of material having a three dimensional appearing pattern printed thereon about the floral grouping with a portion of the sheet of material overlapping other portions of the sheet of material so that the sheet of material substantially encompasses and surrounds a substantial portion of the bloom end of the floral grouping and a substantial portion of the stem end of the floral grouping, the sheet of material having a three dimensional appearing pattern printed thereon wrapped about the floral grouping forming a decorative cover having an opening extending through an upper end thereof with the flower end of the floral grouping being exposed near the opening in the upper end of the decorative cover, the upper end of the wrapping being loosely wrapped about the bloom end of the floral grouping.

37. The method of claim 36 wherein the step of providing the sheet of material is defined further as providing the sheet of material having a thickness in a range of from about 0.1 mil to about 30 mils.

38. The method of claim 36 wherein the step of providing the sheet of material is defined further as providing the sheet of material having a thickness in range of from about 0.5 mil to about 2.5 mils.

39. The method of claim 36 wherein the step of providing the sheet of material is defined further to include the steps of:

providing a roll of the material, the roll of material having a three dimensional appearing printed pattern thereon wherein the three dimensional appearing printed pattern is produced by application of ink compositions to the roll of material to produce the printed pattern having shaded and highlighted areas which provide the printed pattern with a perception of depth and thus the three dimensional appearance;

unrolling material from the roll of material until a predetermined amount of material has been unrolled from the roll of material; and cutting the unrolled material from the roll of material to provide the sheet of material having the three dimensional appearing printed pattern thereon.

40. A method for packaging an item comprising;

providing a sheet of material having a third side and a fourth side, an upper surface and a lower surface, the sheet of material having a printed pattern thereon wherein the printed pattern is produced by application of ink compositions to the sheet of material in a substantially two-dimensional arrangement of the ink compositions so as to produce shaded and highlighted areas in the printed pattern and thereby provide the printed pattern with a perception of depth;

providing a floral grouping having a bloom end and a stem end, the floral grouping comprising the item; and wrapping the sheet of material having the printed pattern thereon about the floral grouping with a portion of the sheet of material overlapping other portions of the sheet of material such that the overlapping portions of the sheet of material extend generally between the third and the fourth sides of the sheet of material and the sheet of material substantially encompasses and surrounds a substantial portion of the stem end of the floral grouping.

41. A method for packaging an item comprising the steps of:

providing a sheet of material having a third side and a fourth side, an upper surface and a lower surface, the sheet of material having a printed pattern thereon wherein the printed pattern is produced by an application of ink composition to the sheet of material in a substantially two-dimensional arrangement of the ink composition, the printed pattern having shaded and highlighted areas which provides the printed pattern with a three dimensional effect;

providing a floral grouping having a stem end and a bloom end, the floral grouping comprising the item;

placing a floral grouping on the sheet of material; and wrapping the sheet of material having the printed pattern thereon about the floral grouping so that the sheet of material substantially encompasses and surrounds a substantial portion of the bloom end of the floral grouping and a substantial portion of the stem end of the floral grouping, the sheet of material being tightly wrapped about the stem end of the floral grouping, the sheet of material having the printed pattern thereon wrapped about the floral grouping forming a conically shaped decorative cover having an opening extending through an upper end thereof with the bloom end of the floral grouping being exposed near the opening in the upper end thereof, the upper end of the decorative cover being loosely wrapped about the flower end of the floral grouping.

42. The method of claim 41 wherein the step of providing the sheet of material is defined further as providing the sheet of material having a thickness in a range of from about 0.1 mil to about 30 mils.

43. The method of claim 41 wherein the step of providing the sheet of material is defined further as providing the sheet of material having a thickness in a range of from about 0.5 mil to about 2.5 mils.

44. The method of claim 41 wherein the step of providing the sheet of material is defined further to comprise the steps of:

providing a roll of the material, the roll of material having the printed pattern thereon containing shaded and highlighted areas which provides the printed pattern with a three dimensional effect;

unrolling material from the roll of material until a predetermined amount of material has been unrolled from the roll of material; and cutting the unrolled material from the roll of material to provide the sheet of material having the printed pattern thereon containing shaded and highlighted areas which provide the printed pattern with a three dimensional effect.

45. A method for packaging an item comprising the steps of:

providing a roll of material having a printed pattern containing shaded and highlighted areas which provide the printed pattern with a three dimensional appearance, the printed pattern being produced by application of ink compositions to the roll of material in a substantially two-dimensional arrangement of the ink compositions;

cutting the roll of material to provide a sheet of material sized to be wrapped about a floral grouping, at least a portion of the sheet of material containing the printed pattern having shaded and highlighted areas which provide the printed pattern with the perception of depth and thus the three dimensional appearance;

providing a floral grouping having a bloom end and a stem end, the floral grouping comprising the item;

placing the floral grouping on the sheet of material; and wrapping the sheet of material containing the printed pattern about the floral grouping with a portion of the sheet of material overlapping other portions of the sheet of material so that the sheet of material substantially encompasses and surrounds a substantial portion of the bloom end of the floral grouping and a substantial portion of the stem end of the floral grouping, the sheet of material being wrapped about the floral grouping so as to form a conically shaped decorative cover having a printed pattern containing shaded and highlighted areas which provide the decorative cover with a printed pattern with the perception of depth and thus the three dimensional appearance, the decorative cover further characterized as having an opening extending through an upper end thereof with the bloom end of the floral grouping exposed near the opening in the upper end of the decorative cover and wherein the upper end of the decorative cover is loosely wrapped about the bloom end of the floral grouping.

46. The method of claim 45 wherein the step of providing the sheet of material is defined further as providing the sheet of material having a thickness in a range of from about 0.1 mil to about 30 mils.

47. The method of claim 45 wherein the step of providing the sheet of material is defined further as providing the sheet of material having a thickness in a range of from about 0.5 mil to about 2.5 mils.

48. A method for covering a floral grouping, the floral grouping having an upper end portion and a lower end portion, comprising the steps of:

provinding a sheet of material having an upper surface, a lower surface, a first side, a second side, a third side and a fourth side, the sheet of material having a printed pattern containing shaded and highlighted areas which provide the printed pattern with a three dimensional appearance, the printed pattern being produced by application of ink compositions in a substantially two-dimensional arrangement of the ink compositions to at least one of the upper surface and the lower surface of the sheet of material, the sheet of material being sized to be disposed about at least a portion of the floral grouping;

a sheet extension connected to the first side of the sheet of material and extending a distance therefrom and extending generally along the entire first side of the sheet of material, the sheet extension being sized for encompassing the upper end portion of the floral grouping;

positioning the sheet of material generally about the floral grouping;

wrapping the sheet of material about the floral grouping so that the sheet of material provides a decorative cover for the floral grouping, the decorative cover having a printed pattern containing shaded and highlighted areas which provide the printed pattern with a three dimensional appearance; and wrapping the sheet extension about the upper end portion of the floral grouping so that portions of the sheet extension overlap whereby the sheet extension substantially encompasses the upper end portion of the floral grouping.

49. The method of claim 48 defined further to include the step of:

forming a line of perforations generally at the connection between the sheet extension and the first side of the sheet of material, the line of perforations extending generally between the first and second ends of the sheet of material; and removing the sheet extension from the sheet of material by tearing the sheet extension generally along the line of perforations for exposing the floral grouping previously encompassed by the sheet extension.

50. The method of claim 49 wherein the sheet of material is defined further as being foldable and bendable whereby the sheet of material can be formed by hand about the floral grouping.

51. The method of claim 50 wherein the step of providing the sheet of material is defined further as providing the sheet of material having a thickness in a range of from about 0.1 mil to about 30 mils.

52. A method for providing a cover for a floral grouping having an upper end portion and a lower end portion, comprising the steps of:

providing a sheet of material having a first side, an opposed second side, an upper surface, a lower surface and a sheet extension extending from the first side of the sheet of material, the sheet of material having a printed pattern on at least a portion of at least one of the upper and lower surfaces thereof, the printed pattern having an appearance of a three dimensional pattern, the printed pattern being produced by application of ink compositions to the sheet of material in a substantially two-dimensional arrangement of the ink compositions such that the printed pattern is provided with shaded and highlighted areas which provide the printed pattern with a perception of depth and thus the three dimensional appearance;

providing the floral grouping having an upper end portion and a lower end portion;

wrapping the sheet of material about the lower end portion of the floral grouping such that portions of the sheet of material overlap and substantially encompass the lower end portion of the floral grouping and thereby provide a cover having the printed pattern thereon extending about the lower end portion of the floral grouping; and wrapping the sheet extension about the upper end portion of the floral grouping such that portions of the sheet extension overlap and substantially encompass the upper end portion of the floral grouping and thereby substantially cover the upper end portion of the floral grouping.

* * * * *